US011901628B1

(12) United States Patent
Deng et al.

(10) Patent No.: US 11,901,628 B1
(45) Date of Patent: Feb. 13, 2024

(54) LUNEBERG LENS ANTENNA WITH ELECTRICALLY POSITION-ADJUSTABLE FEED AND LUNEBERG LENS ANTENNA GROUP

(71) Applicant: FOSHAN EAHISON COMMUNICATION CO., LTD., Foshan (CN)

(72) Inventors: Chongxuan Deng, Foshan (CN); Qiang Zhu, Foshan (CN); Chunhui Shang, Foshan (CN); Liming Gao, Foshan (CN); Youjun Kang, Foshan (CN); Haibo Yang, Foshan (CN); Zhibin Liang, Foshan (CN)

(73) Assignee: FOSHAN EAHISON COMMUNICATION CO., LTD., Foshan (CN)

( * ) Notice: Subject to any disclaimer, the term of this patent is extended or adjusted under 35 U.S.C. 154(b) by 0 days.

(21) Appl. No.: 18/546,232

(22) PCT Filed: Feb. 18, 2022

(86) PCT No.: PCT/CN2022/076807

§ 371 (c)(1),
(2) Date: Aug. 11, 2023

(87) PCT Pub. No.: WO2022/227804

PCT Pub. Date: Nov. 3, 2022

(30) Foreign Application Priority Data

Apr. 28, 2021 (CN) ........................ 202120893757.3

(51) Int. Cl.
*H01Q 15/08* (2006.01)
*H01Q 1/12* (2006.01)

(52) U.S. Cl.
CPC ............ *H01Q 15/08* (2013.01); *H01Q 1/125* (2013.01)

(58) Field of Classification Search
CPC .............................. H01Q 1/125; H01Q 15/08
See application file for complete search history.

(56) References Cited

U.S. PATENT DOCUMENTS

2006/0145940 A1* 7/2006 Kuroda ................ H01Q 19/104 343/911 L
2013/0021214 A1* 1/2013 Zimmerman ............ H01Q 3/08 359/873

(Continued)

FOREIGN PATENT DOCUMENTS

CN 106785444 A 5/2017
CN 209248134 U 8/2019

(Continued)

OTHER PUBLICATIONS

International Search Report issued in corresponding PCT Application No. PCT/CN2022/076807, dated Mar. 30, 2022.

(Continued)

*Primary Examiner* — Hoang V Nguyen
*Assistant Examiner* — Amal Patel
(74) *Attorney, Agent, or Firm* — Westbridge IP LLC

(57) ABSTRACT

A Luneberg lens antenna with a position-electrically adjustable feed includes: a reflecting plate, a feed, a Luneberg lens, and a position adjusting mechanism. The position adjusting mechanism includes a mounting plate, a motor, a guide rail, a sliding block, a connecting base, a screw and a moving base. A position of the mounting plate is relatively fixed to a position of the Luneberg lens. The guide rail is mounted on the mounting plate. Both ends of the screw are rotationally mounted on the mounting plate. The motor is fixed on the mounting plate and configured for driving the screw to rotate. The moving base is provided with a screw hole, and the screw hole of the moving base is in threaded connection with the screw. The present disclosure has characteristics of (Continued)

good stability in adjusting a feed position, convenient assembly and low production cost.

11 Claims, 9 Drawing Sheets

(56) References Cited

U.S. PATENT DOCUMENTS

2019/0237874 A1* 8/2019 Michaelis ................ H01Q 1/42
2021/0111499 A1* 4/2021 Ho ....................... H01Q 19/062

FOREIGN PATENT DOCUMENTS

CN 110380229 A 10/2019
CN 212011271 U * 11/2020
CN 212011271 U 11/2020

OTHER PUBLICATIONS

Written Opinion issued in corresponding PCT Application No. PCT/CN2022/076807, dated Mar. 30, 2022.

* cited by examiner

LUNEBERG LENS ANTENNA WITH ELECTRICALLY POSITION-ADJUSTABLE FEED AND LUNEBERG LENS ANTENNA GROUP

CROSS-REFERENCE TO RELATED APPLICATIONS

This application is the National Stage of International Application No. PCT/CN2022/076807, filed on Feb. 18, 2022, which claims priority to Chinese Patent Application No. 2021208937573, filed on Apr. 28, 2021. All of the aforementioned applications are incorporated herein by reference in their entireties.

TECHNICAL FIELD

The present disclosure relates to the technical field of communication devices, and in particular to a Luneberg lens antenna with a position-electrically adjustable feed and a Luneberg lens antenna group.

BACKGROUND

For a traditional Luneberg lens antenna, when a radiation angle of a feed is required to be changed by adjusting its tilt angle, tower operators are required to climb a tower to adjust a pitch angle of a clamp on site to match the optimal effect, which is time-consuming and labor-intensive. In bad weather like wind or snow, this adjusting way increases operation difficulty, and a manually adjusting way brings large error. In order to reduce operating difficulty of the operators and avoid climbing of a tower by the operators to adjust an antenna every time, there are also some Luneberg lens antennas commercially available for which a position of a feed can be electrically adjusted. As technical schemes in Chinese Patent Application No. 202020408992.2, applied by the applicant and entitled "Electrically Adjustable Luneberg LensAntenna", this type of Luneberg lens antenna includes: a feed, a Luneberg lens, a mounting rack, and a position adjusting mechanism. A spherical surface is formed on the Luneberg lens, and the Luneberg lens is relatively fixed together with the mounting rack. The position adjusting mechanism includes a swinging rack, a driving rod, a driving base, and a transmission device. The driving rod is rotationally mounted on the mounting rack. The transmission device is also mounted on the mounting rack and configured for driving the driving rod to rotate. The driving base is connected with the driving rod, and can move in a straight line along the driving rod by rotation of the driving rod. The swinging rack is between the mounting rack and the Luneberg lens, a swinging rod is connected to the swinging rack, and a rotating end that can rotate relative to the Luneberg lens is formed on the swinging rod, so that the swinging rack can swing relative to a center of the spherical surface of the Luneberg lens. The feed is mounted on the swinging rack, and a connecting rod is hinged between the swinging rack and the driving base. This structure of realizing adjustment of a feed position by swinging of the swing rack is not stable, and the swinging rod of the swinging rack needs to be mounted by hinging, which is not convenient to assemble. Based on shortcomings of an existing Luneberg lens antenna, it is urgent to improve a structure of the existing Luneberg lens antenna.

SUMMARY

The present disclosure aims to provide a Luneberg lens antenna with a position-electrically adjustable feed, which has advantages of simple structure, reasonable design, good stability in adjusting a feed position, convenient assembly and low production cost.

A technical solution of the Luneberg lens antenna with the position-electrically adjustable feed is realized as follows. The Luneberg lens antenna with the position-electrically adjustable feed may include a reflecting plate, a feed, a Luneberg lens, and a position adjusting mechanism. The position adjusting mechanism includes a mounting plate, a motor, a guide rail, a sliding block, a connecting base, a screw and a moving base. A position of the mounting plate is relatively fixed to A position of the Luneberg lens, and a surface, facing the Luneberg lens, of the mounting plate is a mounting surface. The guide rail is mounted on the mounting plate and between the mounting surface and the Luneberg lens. Both ends of the screw are rotationally mounted on the mounting plate, and orthographic projections, on the mounting surface, of an axis of the screw and an axis of the guide rail are parallel to each other. The motor is fixed on the mounting plate and configured for driving the screw to rotate. The moving base is provided with a screw hole, and the screw hole of the moving base is in threaded connection with the screw. The reflecting plate is arranged between the Luneberg lens and the guide rail. The sliding block is mounted on the reflecting plate and in sliding fit connection with the guide rail. One end of the connecting base is connected with the moving base, and the other end of the connecting base is connected with the reflecting plate. The feed is mounted on a surface, facing the Luneberg lens, of the reflecting plate.

Further, the position adjusting mechanism further includes a guide rod, both ends of the guide rod are mounted on the mounting plate, and an axis of the guide rod is parallel to the axis of the screw. A guide part is provided on the moving base, the guide part is provided with a guide hole, and the guide hole of the moving base is sleeved on the guide rod.

Furthermore, the guide rail includes a left guide rail and a right guide rail, and both the left guide rail and the right guide rail are provided with a guide rail groove along their axes. Both the motor and the screw are between the left guide rail and the right guide rail. The sliding block includes a left sliding block and a right sliding block. Both the left sliding block and the right sliding block are provided with a sliding part. The sliding part of the left sliding block is in sliding fit with the guide rail groove of the left guide rail, and the sliding part of the right sliding block is in sliding fit with the guide rail groove of the right guide rail.

Furthermore, the guide rail grooves on the left guide rail and the right guide rail are of a linear structure, and the sliding parts on the left sliding block and the right sliding block are also of a linear structure. One end of the connecting base is fixedly connected with the moving base, and the other end of the connecting base is fixedly connected with the reflecting plate.

Furthermore, cross sections of the guide rail grooves on the left guide rail and the right guide rail are of an inverted-T-shaped structure, and cross sections of the sliding parts on the left sliding block and the right sliding block are also of an inverted-T-shaped structure.

Beneficial effects of the Luneberg lens antenna with the position-electrically adjustable feed are as follow. The reflecting plate of the Luneberg lens antenna with a position-electrically adjustable feed can slide along the guide rail through the sliding block, so that the position of the feed on the reflecting plate can be adjusted relative to the Luneberg lens. When the position of the feed is adjusted, the screw is driven by the motor to rotate to make the moving base on the screw move in the straight line along the axis of the screw, so that the connecting base on the moving base can drive the reflecting plate to move along the guide rail. In this way, the reflecting plate can move in a direction set by a shape of the guide rail, instead of being connected by a rotating shaft to adjust the position relative to the Luneberg lens, which is with good operational stability, and convenient assembly; therefore, the Luneberg lens antenna with the position-electrically adjustable feed has advantages of simple structure, reasonable design, good stability in adjusting a feed position, convenient assembly and low production cost.

A Luneberg lens antenna group is further provided in the present disclosure, which has advantages of simple structure, reasonable design, high adjustment efficiency and convenient use.

A technical scheme of the Luneberg lens antenna group is realized as follows. The Luneberg lens antenna group includes a first Luneberg lens antenna and a number of second Luneberg lens antennas. The first Luneberg lens antenna and the number of second Luneberg lens antennas are arranged side by side in a straight line. The first Luneberg lens antenna is the Luneberg lens antenna with the position-electrically adjustable feed described in the above scheme. Difference between the second Luneberg lens antenna and each first Luneberg lens antenna is that: there is no motor, screw and moving base on the second Luneberg lens antenna. A connecting base of the first Luneberg lens antenna is fixed together with a connecting base of each second Luneberg lens antenna through a rigid component.

Beneficial effects of the Luneberg lens antenna group are as follows. During use, the motor of the first Luneberg lens antenna drives its screw to rotate to make the moving base of the first Luneberg lens antenna move along the screw, so that the connecting base fixed together with the moving base on the first Luneberg lens antenna and the connecting base of the second Luneberg lens antenna act simultaneously; the connecting bases of the first Luneberg lens antenna and the second Luneberg lens antennas are all connected with the reflecting plate, the reflecting plates of the first Luneberg lens antenna and the second Luneberg lens antennas are all provided with feeds, and then positions of the feeds of a plurality of Luneberg lens antennas can be adjusted in a linkage mode; therefore, the Luneberg lens antenna group has advantages of simple structure, reasonable design, high adjustment efficiency and convenient use.

DETAILED DESCRIPTION OF THE EMBODIMENTS

Embodiment 1

Figure 1:
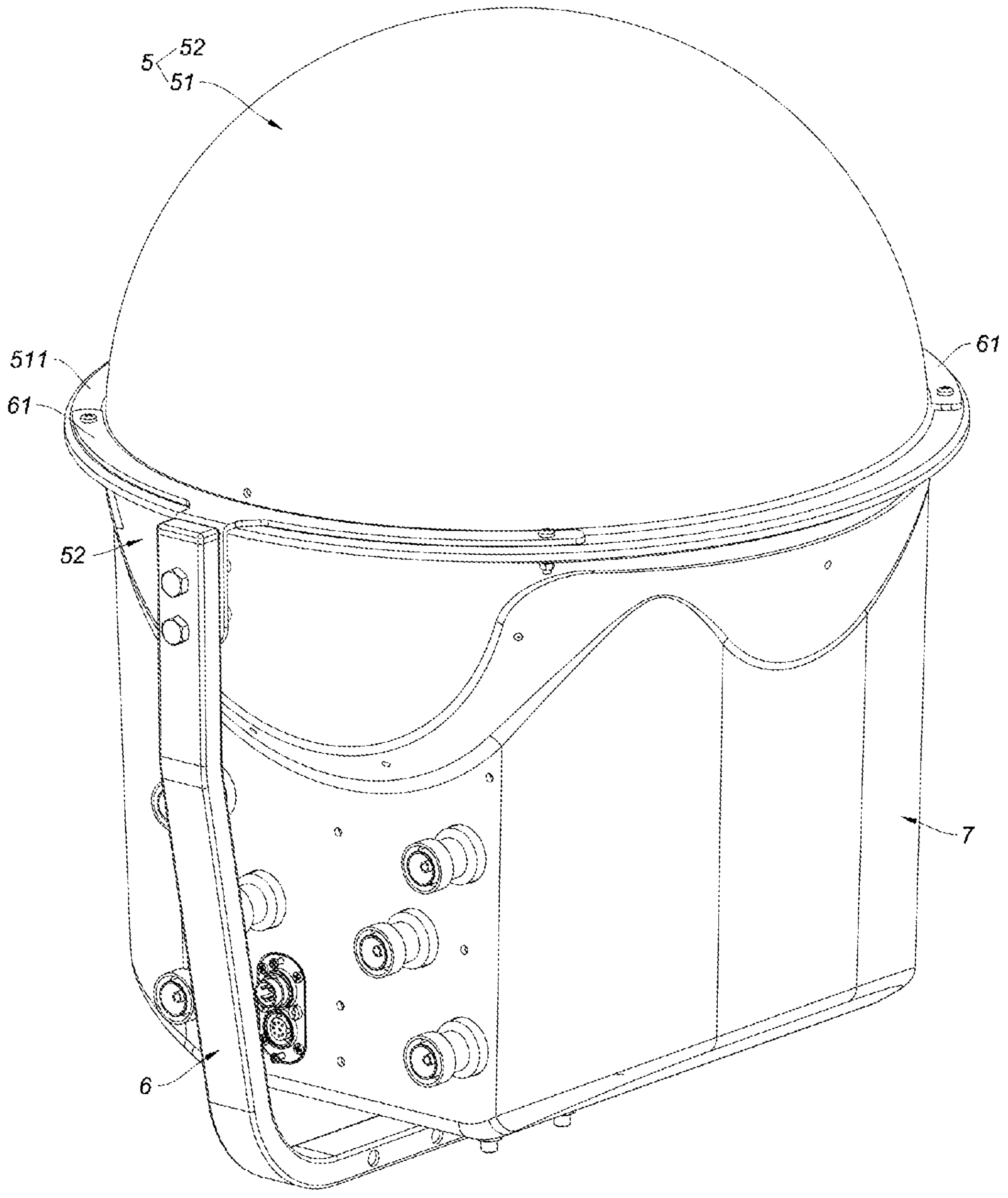
FIG. 1 is a structure diagram of Embodiment 1.

As shown in FIG. 1, FIG. 2, FIG. 3 and FIG. 4, a Luneberg lens antenna with a position-electrically adjustable feed of this embodiment includes: a reflecting plate 1, a feed 2, a Luneberg lens 3, and a position adjusting mechanism 4. The position adjusting mechanism 4 includes a mounting plate 41, a motor 42, a guide rail 43, a sliding block 44, a connecting base 45, a screw 46 and a moving base 47. A position of the mounting plate 41 is relatively fixed to a position of the Luneberg lens 3, a surface, facing the Luneberg lens 3, of the mounting plate 41 is a mounting surface 411. The Luneberg lens 3 is a spheroid Luneberg lens, and the mounting surface 411 is a plane. The guide rail 43 is mounted on the mounting plate 41 and between the mounting surface 411 and the Luneberg lens 3. Both ends of the screw 46 are rotationally mounted on the mounting plate 41, and orthographic projections, on the mounting surface 411, of an axis of the screw 46 and an axis of the guide rail 43 are parallel to each other. The motor 42 is fixed on the mounting plate 41 and configured for driving the screw 46 to rotate. The moving base 47 is provided with a screw hole 472, and the screw hole 472 of the moving base 47 is in threaded connection with the screw 46. The reflecting plate 1 is arranged between the Luneberg lens 3 and the guide rail 43. The sliding block 44 is mounted on the reflecting plate 1 and in sliding fit connection with the guide rail 43. One end of the connecting base 45 is connected with the moving base 47, and the other end thereof is connected with the reflecting plate 1. The feed 2 is mounted on a surface, facing the Luneberg lens 3, of the reflecting plate 1, and the surface, facing the Luneberg lens 3, of the reflecting plate 1 is a reflecting surface. The reflecting plate 1 of the Luneberg lens antenna with the position-electrically adjustable feed can slide along the guide rail 43 through the sliding block 44, so that a position of the feed 2 on the reflecting plate 1 can be adjusted relative to the Luneberg lens 3. When the position of the feed 2 is adjusted, the screw 46 is driven by the motor 42 to rotate to make the moving base 47 on the screw 46 move in a straight line along the axis of the screw 46, so that the connecting base 45 on the moving base 47 can drive the reflecting plate 1 to move along the guide rail 43. In this way, the reflecting plate 1 can move in a direction set by a shape of the guide rail 43, instead of being connected by a rotating shaft to adjust the position relative to the Luneberg lens 3, which is with good operational stability and convenient assembly. Therefore, the Luneberg lens antenna with the position-electrically adjustable feed has advantages of simple structure, reasonable design, good stability in adjusting a feed position, convenient assembly and low production cost.

Figure 2:
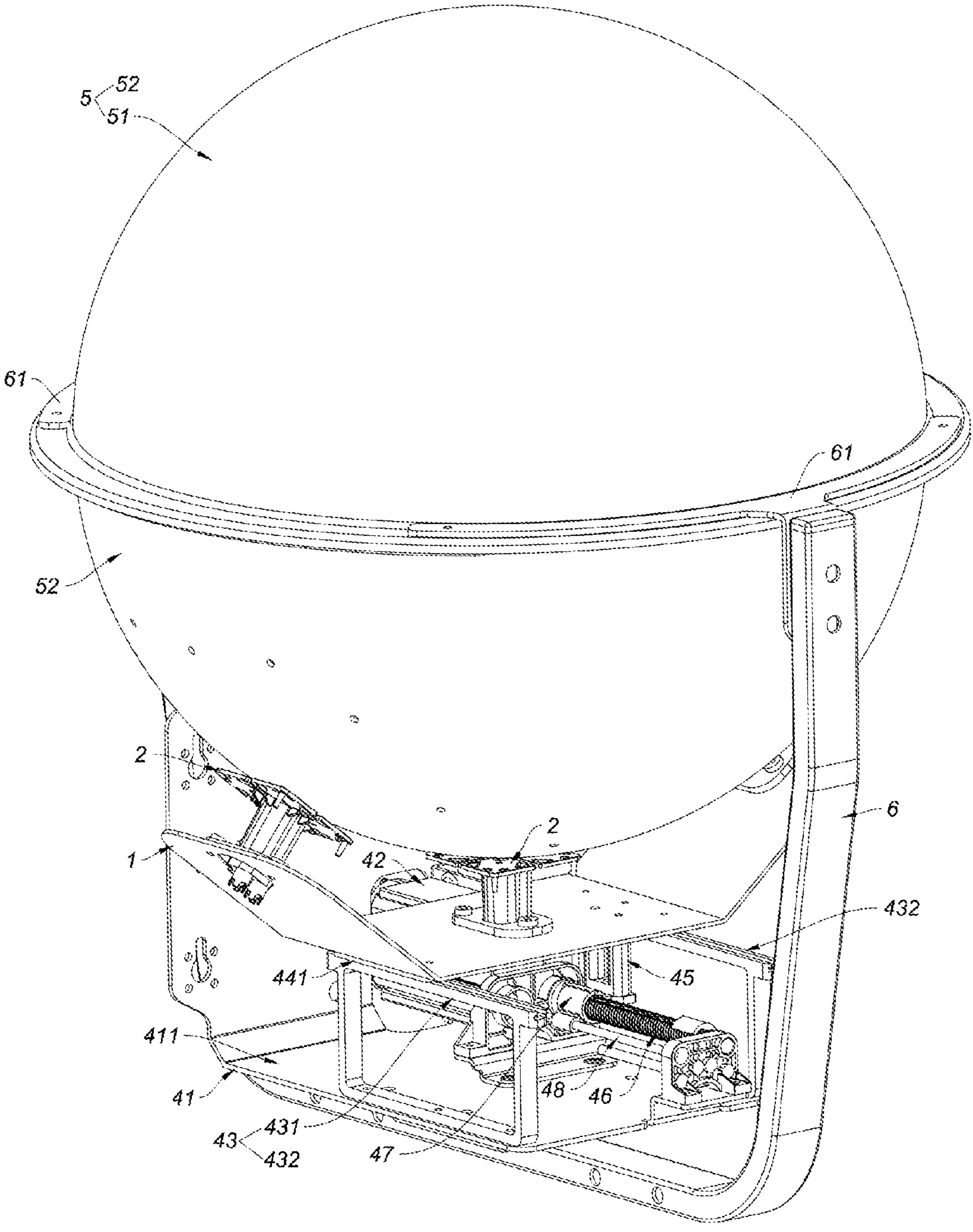
FIG. 2 is a structure diagram of Embodiment 1 after an outer shell is removed.
Figure 3:
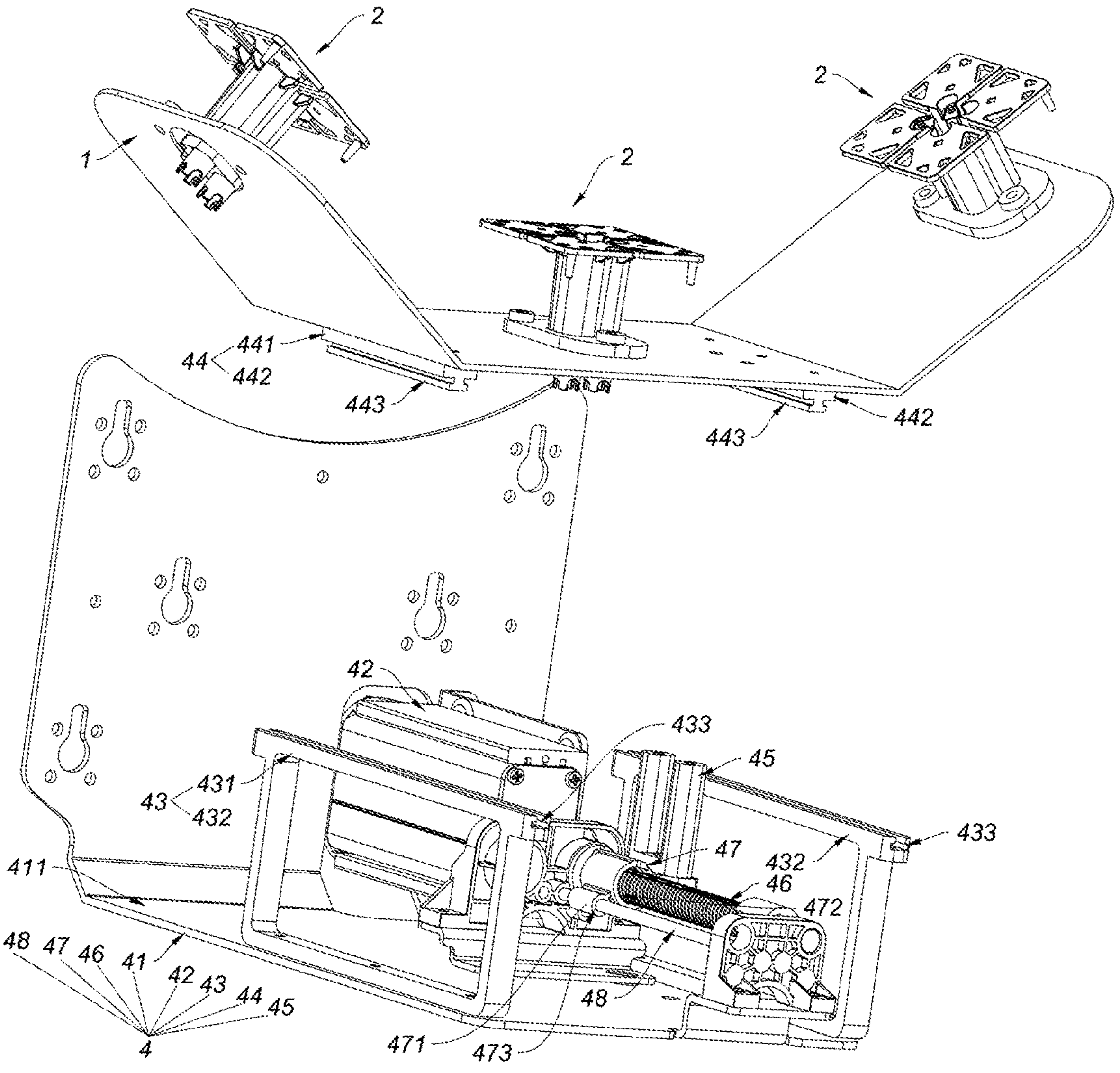
FIG. 3 is a structure diagram of a disassembled reflecting plate and position adjusting mechanism in Embodiment 1.

For better operational stability of the Luneberg lens antenna with a position-electrically adjustable feed when the position of the feed 2 is adjusted, as shown in FIG. 2 and FIG. 3, the position adjusting mechanism 4 further includes a guide rod 48, both ends of the guide rod 48 are mounted on the mounting plate 41, and an axis of the guide rod 48 is parallel to the axis of the screw 46; a guide part 471 is provided on the moving base 47, the guide part 471 is provided with a guide hole 473, and the guide hole 473 of the moving base 47 is sleeved on the guide rod 48.

In order to make the structure of the Luneberg lens antenna with a position-electrically adjustable feed more reasonable and further improve the operational stability when the position of the feed 2 is adjusted, as shown in FIG. 2 and FIG. 3, the guide rail 43 includes a left guide rail 431 and a right guide rail 432, and both the left guide rail 431 and the right guide rail 432 are provided with a guide rail groove 433 along their axes. The motor 42, the screw 46 and the guide rod 48 are all between the left guide rail 431 and the right guide rail 432. The sliding block 44 includes a left sliding block 441 and a right sliding block 442. Both the left sliding block 441 and the right sliding block 442 are provided with a sliding part 443. The sliding part 443 of the left sliding block 441 is in sliding fit with the guide rail groove 433 of the left guide rail 431, and the sliding part 443 of the right sliding block 442 is in sliding fit with the guide rail groove 433 of the right guide rail 432.

In order to enable the feed 2 of the Luneberg lens antenna with a position-electrically adjustable feed to move in the straight line to adjust the position, as shown in FIG. 2 and FIG. 3, the guide rail grooves 433 on the left guide rail 431 and the right guide rail 432 are of a linear structure, and the sliding parts 443 on the left sliding block 441 and the right sliding block 442 are also of a linear structure; one end of the connecting base 45 is fixedly connected with the moving base 47, and the other end of the connecting base 45 is fixedly connected with the reflecting plate 1.

In order to make a structure of assembling the left guide rail 431 and the right guide rail 432 correspondingly with the left sliding block 441 and the right sliding block 442 more reasonable, as shown in FIG. 2 and FIG. 3, cross sections of the guide rail grooves 433 on the left guide rail 431 and the right guide rail 432 are of an inverted-T-shaped structure, and cross sections of the sliding parts 443 on the left sliding block 441 and the right sliding block 442 are also of an inverted-T-shaped structure. Sliding fit between the sliding part 443 of the inverted-T-shaped structure and the guide rail groove 433 of the inverted-T-shaped structure is good, and there is no risk of derailment when the Luneberg lens antenna with a position-electrically adjustable feed is mounted aslant.

Figure 4:
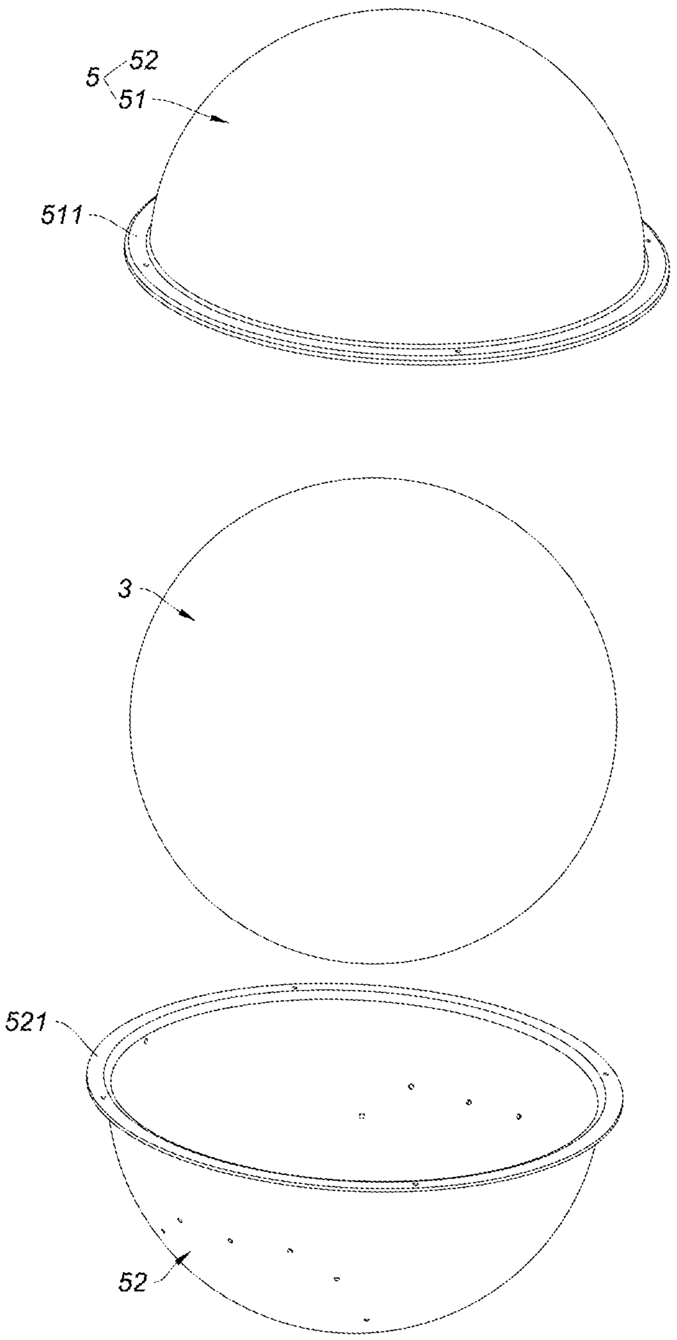
FIG. 4 is a structure diagram of a disassembled cover shell and Luneberg lens in Embodiment 1.

In order to make a mounting structure of the Luneberg lens more reasonable, as shown in FIG. 1, FIG. 2 and FIG. 4, the Luneberg lens antenna with the position-electrically adjustable feed further includes: a cover shell 5 and a support 6. The cover shell 5 includes an upper half shell 51 and a lower half shell 52. The upper half shell 51 is formed with an upper fixing ring 511 along an edge of its shell opening, the lower half shell 52 is formed with a lower fixing ring 521 along an edge of its shell opening, and the upper half shell 51 is assembled with the lower half shell 52 to form a mounting chamber. The Luneberg lens 3 is mounted in the mounting chamber. There are two fixing lugs 61 arranged on the support 6, and both the upper fixing ring 511 of the upper half shell 51 and the lower fixing ring 521 of the lower half shell 52 are fixedly connected with the two fixing lugs 61 on the support 6. The mounting plate 41 is fixed on the support 6.

In order to prevent dust and moisture and prolong service life of the Luneberg lens antenna with the position-electrically adjustable feed, as shown in FIG. 1, the Luneberg lens antenna with the position-electrically adjustable feed further includes an outer shell 7. The outer shell 7 is fixed on the support 6. The position adjusting mechanism 4, the reflecting plate 1 and the feed 2 are all in the outer shell 7; and an edge of a shell opening of the outer shell 7 is affixed to an outer surface of the lower half shell 52.

Embodiment 2

Figure 5:
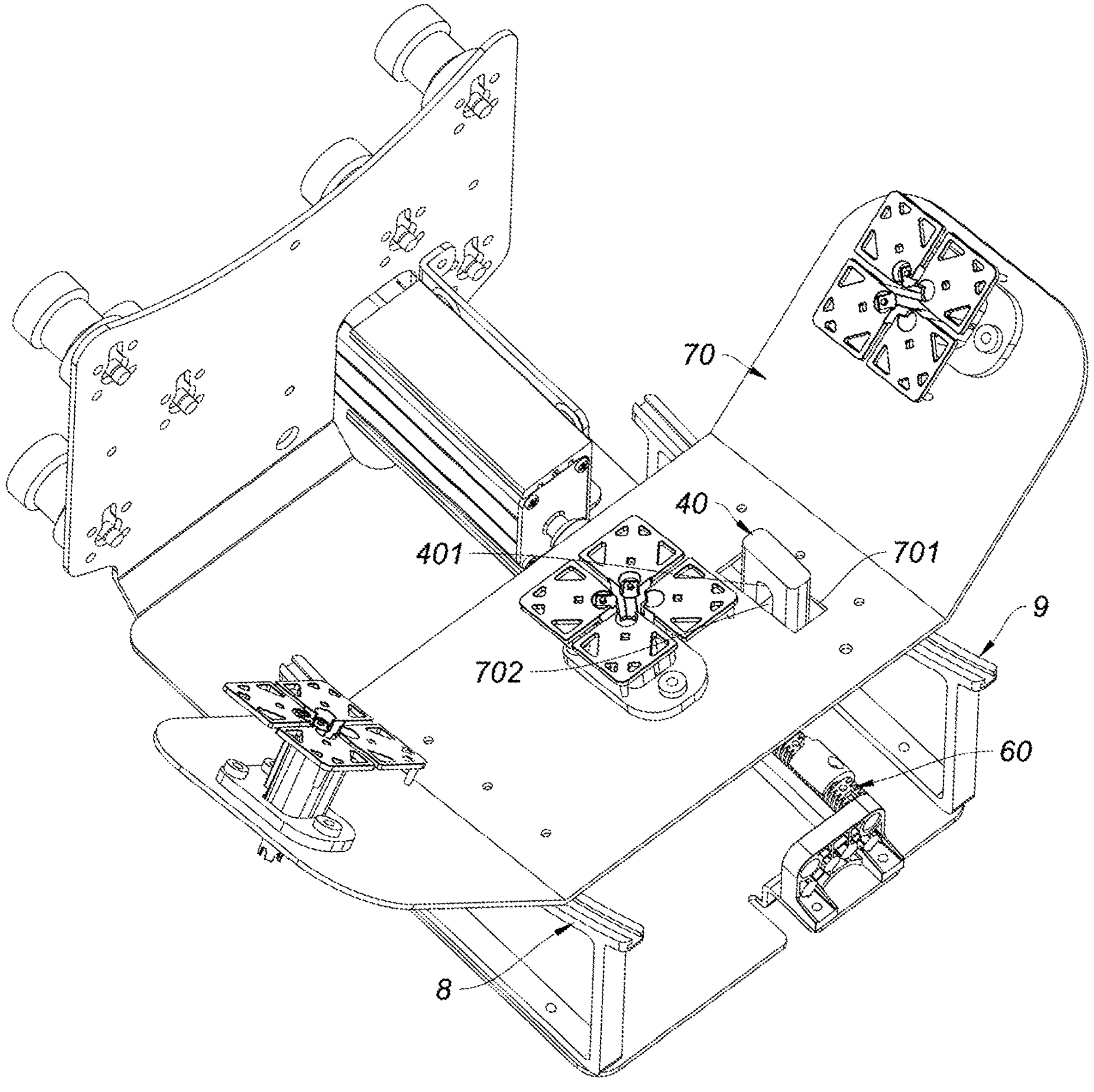
FIG. 5 is a structure diagram of Embodiment 2 after a reflecting plate and a position adjusting mechanism are assembled.
Figure 6:
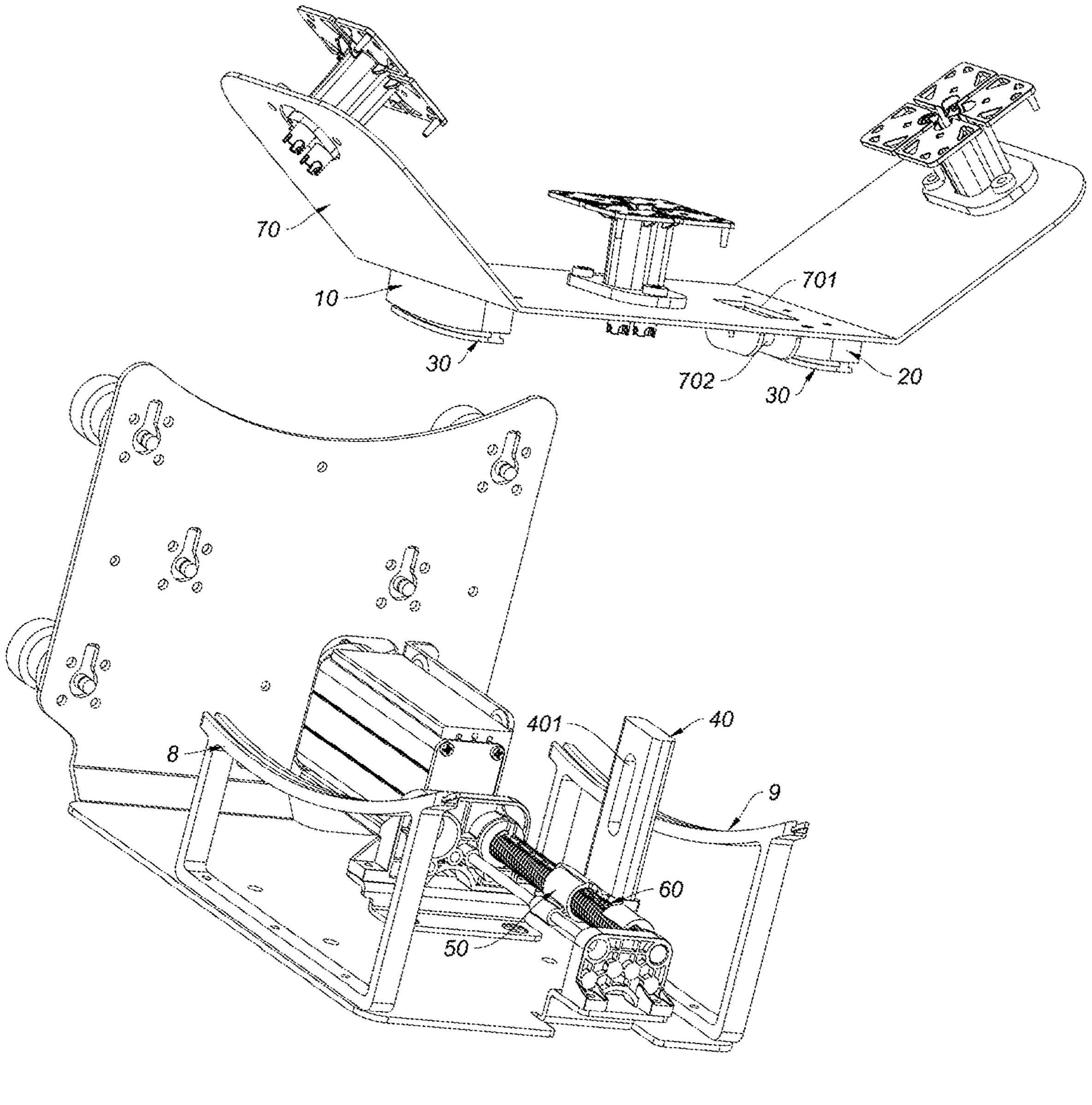
FIG. 6 is a structure diagram of a disassembled reflecting plate and position adjusting mechanism in Embodiment 2.

Difference between this embodiment and embodiment 1 is that: as shown in FIG. 5 and FIG. 6, both the left guide rail 8 and the right guide rail 9 are of an arc-shaped strip structure, and a center of the left guide rail 8, a center of the right guide rail 9 and a spherical center of the Luneberg lens are collinear. The sliding parts 30 of the left sliding block 10 and the right sliding block 20 are also of an arc-shaped strip structure. One end of the connecting base 40 is fixedly connected with the moving base 50, and the other end of the connecting base 40 is formed with a pushing-type long hole 401, and a length direction of the pushing-type long hole 401 is vertical to the axis of the screw 60. There is a movable hole 701 formed on the reflecting plate 70 for an end, formed with the pushing long hole 401, of the connecting base 40 to pass through. There is also a pushing rod 702 fixed on the reflecting plate 70, the pushing rod 702 passes through the pushing-type long hole 401 of the connecting base 40, and projections, on the mounting surface of the mounting plate, of the axis of the pushing rod 702 and the axis of the screw 60 are vertical to each other. In this embodiment, with this structure design, the feed can move along the arc-shaped part left guide rail 8 and right guide rail 9 to adjust the position, so that no matter where the feed is adjusted, it can always point to the spherical center of the Luneberg lens, and thus, the feed receives and transmits signals better.

Embodiment 3

Figure 7:
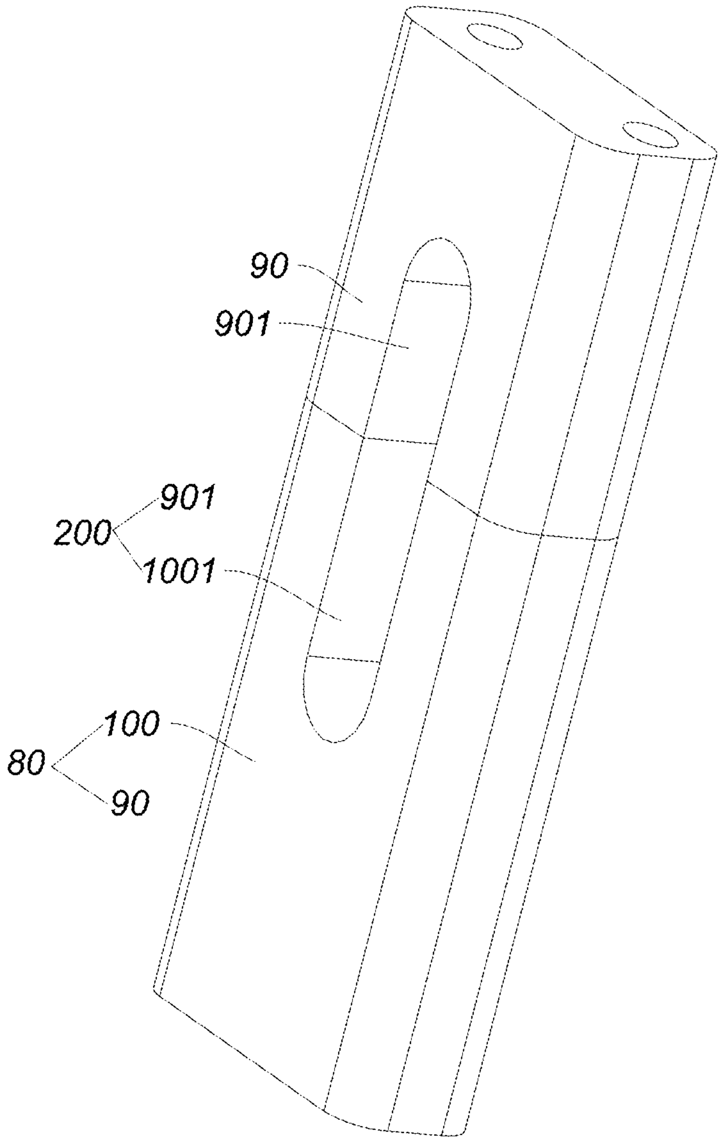
FIG. 7 is a structure diagram of a connecting base in Embodiment 3.

Difference between this embodiment and Embodiment 2 is that the structures of the connecting bases are different. The connecting base in Embodiment 2 is produced in one piece. As shown in FIG. 7, the connecting base 80 of this embodiment is composed of an upper mounting base 90 and a lower mounting base 100. The lower mounting base 100 is fixed on the moving base, a down recessed part 1001 with a notch facing up is formed on the lower mounting base 100. The upper mounting base 90 is fixedly connected with the lower mounting base 100, an up recessed part 901 with a notch facing down is formed on the upper mounting base 90. The up recessed part 901 is assembled with the down recessed part 1001 to form the pushing-type long hole 200. In this embodiment, with design of forming the pushing long hole 200 through this assembled structure, when the Luneberg lens antenna with the feed moving along an arc path needs to be changed to the Luneberg lens antenna with the feed traveling along a straight path, it is only necessary to replace the reflecting plate, the guide rail and the sliding block described in Embodiment 1 correspondingly with the reflecting plate, the guide rail and the sliding block in Embodiment 2, and remove the upper mounting base 90 to make the lower mounting base 100 connect the moving base with the reflecting plate. In this way, a speed of improvement can be greatly improved, and developing cost of products can be further reduced.

Embodiment 4

Figure 8:
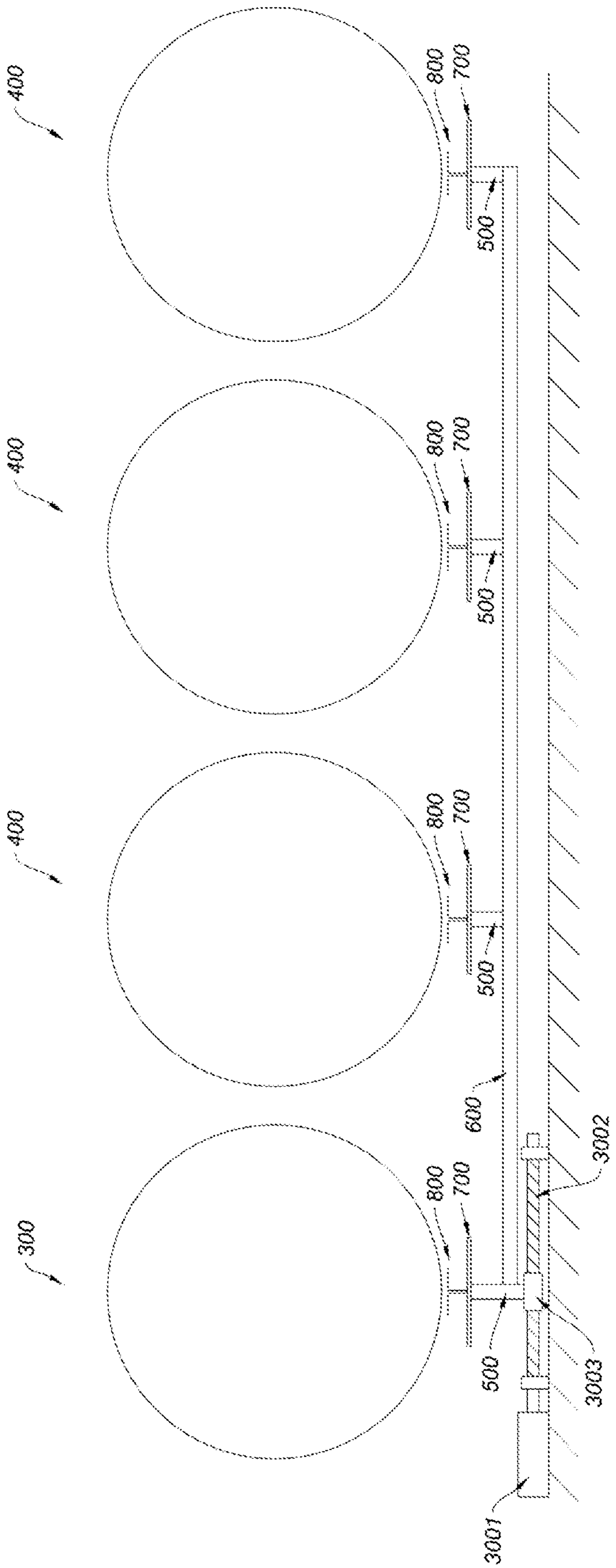
FIG. 8 is a structure diagram of Embodiment 4.

As shown in FIG. 8, a Luneberg lens antenna group is provided in this disclosure, which includes a first Luneberg lens antenna 300 and a number of second Luneberg lens antennas 400, and the first Luneberg lens antenna 300 and a number of second Luneberg lens antennas 400 are arranged side by side in a straight line. The first Luneberg lens antenna 300 is of a structure of the Luneberg lens antenna with the position-electrically adjustable feed described in Embodiment 1 after the outer shell is removed. Difference between each second Luneberg lens antenna 400 and the first Luneberg lens antenna 300 is that: there is no motor, screw and moving base on the second Luneberg lens antenna 400, and correspondingly, there are also no related components, such as a guide rod, connected with the motor, the screw and the moving base on the second Luneberg lens antenna 400 relative to the first Luneberg lens antenna 300. A connecting base 500 of the first Luneberg lens antenna 300 is fixed together with a connecting base 500 of each second Luneberg lens antenna 400 through a rigid component 600. It is noted here that, in implementation, the first Luneberg lens antenna 300 and each second Luneberg lens antenna 400 may share a mounting plate to mount the guide rail. During use, the motor 3001 of the first Luneberg lens antenna 300 drives its screw 3002 to rotate to make a moving base 3003 of the first Luneberg lens antenna 300 move along the screw 3002, so that the connecting base 500 fixed together with the moving base 3003 on the first Luneberg lens antenna 300 and the connecting base 500 of the second Luneberg lens antenna 400 act simultaneously. The connecting bases 500 of the first Luneberg lens antenna 300 and the second Luneberg lens antennas 400 are all connected with the reflecting plate 700, the reflecting plates 700 of the first Luneberg lens antenna 300 and the second Luneberg lens antennas 400 are all provided with a feed 800, so that the positions of the feeds of a plurality of Luneberg lens antennas can be adjusted in a linkage mode, which is with high operation efficiency and convenient to use.

Embodiment 5

Figure 9:
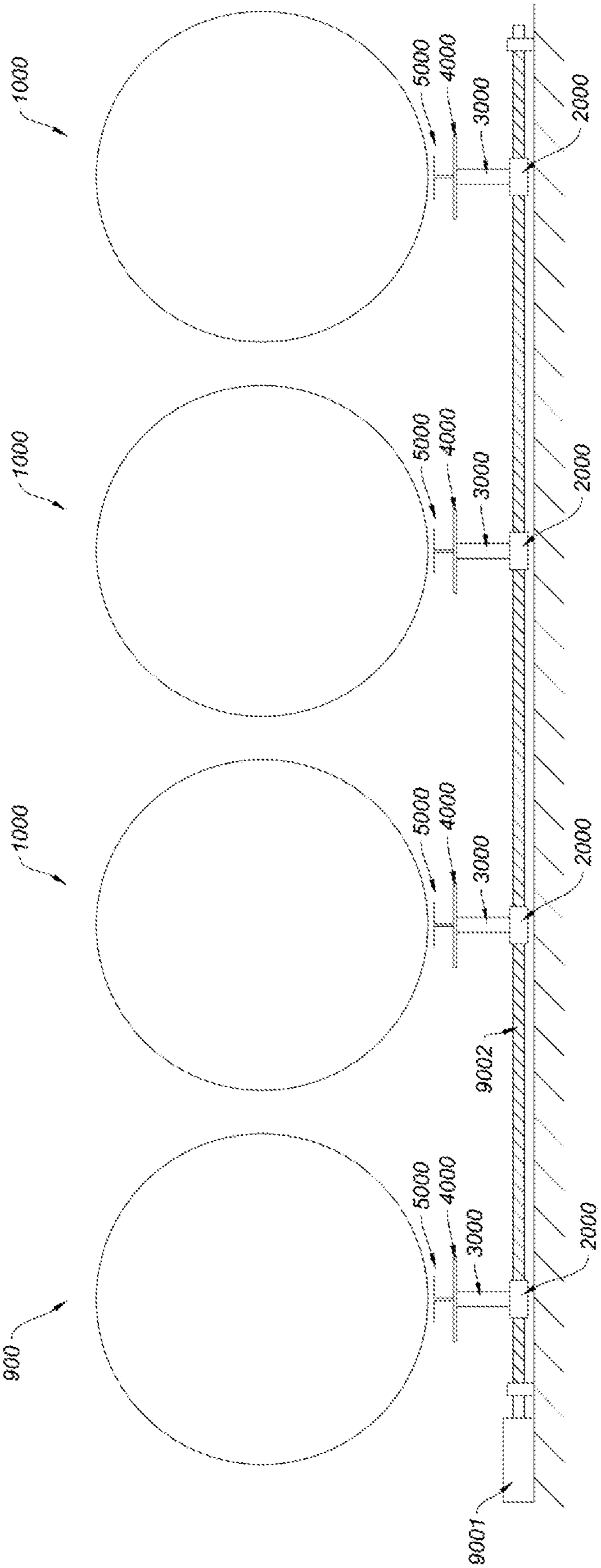
FIG. 9 is a structure diagram of Embodiment 5.

As shown in FIG. 9, a Luneberg lens antenna group is further provided in this disclosure, which includes a first Luneberg lens antenna 900 and a number of second Luneberg lens antennas 1000, and the first Luneberg lens antenna 900 and a number of second Luneberg lens antennas 1000 are arranged side by side in a straight line. The first Luneberg lens antenna 900 is of a structure of the Luneberg lens antenna with the position-electrically adjustable feed described in embodiment 2 after the shell is removed. Difference between each second Luneberg lens antenna 1000 and the first Luneberg lens antenna 900 is that: there is no motor and screw on the second Luneberg lens antenna 1000, and correspondingly, there are also no related components, such as a guide rod, connected with the motor and the screw on the second Luneberg lens antenna 1000 relative to the first Luneberg lens antenna 900. A screw 9002 of the first Luneberg lens antenna 900 is also in threaded connection with a screw hole of a moving base 2000 of each second Luneberg lens antenna 1000, and a guide hole in the moving base 2000 of the second Luneberg lens antenna 1000 is sleeved on a guide rod of the first Luneberg lens antenna 900. In implementation, the first Luneberg lens antenna 900 and each second Luneberg lens antenna 1000 may share a mounting plate to mount the guide rail. In implementation, the motor 1000 of the first Luneberg lens antenna 900 drives its screw 9002 to rotate to enable the moving base 2000 of the first Luneberg lens antenna 900 and the moving base 2000 of each second Luneberg lens antenna 1000 to move along the screw 9002. The moving bases 2000 of the first Luneberg lens antenna 900 and the second Luneberg lens antennas 1000 are all connected with the reflecting plate 4000 through a connection base 3000, reflecting plates 4000 of the first Luneberg lens antenna 900 and the second Luneberg lens antennas 1000 are all provided with a feed 5000, and then positions of the feeds of a plurality of Luneberg lens antennas can be adjusted in a linkage mode, which is with high operation efficiency, and is convenient to use.

The invention claimed is:

1. A Luneberg lens antenna with a position-electrically adjustable feed, comprising: a reflecting plate, a feed, a Luneberg lens, and a position adjusting mechanism; wherein, the position adjusting mechanism comprises a mounting plate, a motor, a guide rail, a sliding block, a connecting base, a screw and a moving base; a position of the mounting plate is relatively fixed to a position of the Luneberg lens, and a surface, facing the Luneberg lens, of the mounting plate is a mounting surface; the guide rail is mounted on the mounting plate and between the mounting surface and the Luneberg lens; both ends of the screw are rotationally mounted on the mounting plate, and orthographic projections, on the mounting surface, of an axis of the screw and an axis of the guide rail are parallel to each other; the motor is fixed on the mounting plate and configured for driving the screw to rotate; the moving base is provided with a screw hole, and the screw hole of the moving base is in threaded connection with the screw; the reflecting plate is arranged between the Luneberg lens and the guide rail; the sliding block is mounted on the reflecting plate and in sliding fit connection with the guide rail; one end of the connecting base is connected with the moving base, and the other end of the connecting base is connected with the reflecting plate; and the feed is mounted on a surface, facing the Luneberg lens, of the reflecting plate.

2. The Luneberg lens antenna with the position-electrically adjustable feed according to claim 1, wherein the position adjusting mechanism further comprises a guide rod, both ends of the guide rod are mounted on the mounting plate, and an axis of the guide rod is parallel to the axis of the screw; a guide part is provided on the moving base, the guide part is provided with a guide hole, and the guide hole of the moving base is sleeved on the guide rod.

3. The Luneberg lens antenna with the position-electrically adjustable feed according to claim 2, wherein the guide rail comprises a left guide rail and a right guide rail, both the left guide rail and the right guide rail are provided with a guide rail groove along their axes; both the motor and the screw are between the left guide rail and the right guide rail; and the sliding block comprises a left sliding block and a right sliding block, both the left sliding block and the right sliding block are provided with a sliding part, the sliding part of the left sliding block is in sliding fit with the guide rail groove of the left guide rail, and the sliding part of the right sliding block is in sliding fit with the guide rail groove of the right guide rail.

4. The Luneberg lens antenna with the position-electrically adjustable feed according to claim 3, wherein the guide rail grooves on the left guide rail and the right guide rail are of a linear structure, and the sliding parts on the left sliding block and the right sliding block are also of a linear structure; one end of the connecting base is fixedly connected with the moving base, and the other end of the connecting base is fixedly connected with the reflecting plate.

5. The Luneberg lens antenna with the position-electrically adjustable feed according to claim 3, wherein both the left guide rail and the right guide rail are of an arc-shaped strip structure; the sliding parts of the left sliding block and the right sliding block are also of an arc-shaped strip structure; one end of the connecting base is fixedly connected with the moving base, and the other end of the connecting base is formed with a pushing-type long hole, and a length direction of the pushing long hole is vertical to the axis of the screw; there is a movable hole formed on the reflecting plate for an end, formed with the pushing long hole, of the connecting base to pass through; there is also a pushing rod fixed on the reflecting plate, the pushing rod passing through the pushing-type long hole of the connecting base, and projections, on the mounting surface of the mounting plate, of an axis of the pushing rod and the axis of the screw are vertical to each other.

6. The Luneberg lens antenna with the position-electrically adjustable feed according to claim 5, wherein the connecting base is composed of an upper mounting base and a lower mounting base, the lower mounting base is fixed on the moving base a down recessed part with a notch facing up is formed on the lower mounting base, and the upper mounting base is fixedly connected with the lower mounting base, an up recessed part with a notch facing down is formed on the upper mounting base; the up recessed part is assembled with the down recessed part to form the pushing-type long hole.

7. The Luneberg lens antenna with the position-electrically adjustable feed according to claim 4, wherein cross sections of the guide rail grooves on the left guide rail and the right guide rail are of an inverted-T-shaped structure, and cross sections of the sliding parts on the left sliding block and the right sliding block are also of an inverted-T-shaped structure.

8. The Luneberg lens antenna with the position-electrically adjustable feed according to claim 1, further comprising: a cover shell and a support, wherein the cover shell comprises an upper half shell and a lower half shell, the upper half shell is formed with an upper fixing ring along an edge of its shell opening, the lower half shell is formed with a lower fixing ring along an edge of its shell opening, and the upper half shell is assembled with the lower half shell to form a mounting chamber, the Luneberg lens is mounted in the mounting chamber; and there are two fixing lugs arranged on the support, both the upper fixing ring of the upper half shell and the lower fixing ring of the lower half shell are fixedly connected with the two fixing lugs on the support; and the mounting plate is fixed on the support.

9. A Luneberg lens antenna group, comprising a first Luneberg lens antenna and a number of second Luneberg lens antennas the first Luneberg lens antenna and a number of second Luneberg lens antennas being arranged side by side in a straight line, wherein the first Luneberg lens antenna is the Luneberg lens antenna with the position-electrically adjustable feed according to claim 1, difference between each second Luneberg lens antenna and the first Luneberg lens antenna is that: there is no motor, screw and moving base on the second Luneberg lens antenna, and a connecting base of the first Luneberg lens antenna is fixed together with a connecting base of each second Luneberg lens antenna through a rigid component.

10. A Luneberg lens antenna group, comprising a first Luneberg lens antenna and a number of second Luneberg lens antennas; the first Luneberg lens antenna and a number of second Luneberg lens antennas being arranged side by side in a straight line, wherein the first Luneberg lens antenna is the Luneberg lens antenna with the position-electrically adjustable feed according to claim 1, difference between the second Luneberg lens antenna and the first Luneberg lens antenna is that: there is no motor and screw on the second Luneberg lens antenna, and a screw of the first Luneberg lens antenna is also in threaded connection with a screw hole of a connecting base of each second Luneberg lens antenna.

11. The Luneberg lens antenna with the position-electrically adjustable feed according to claim 5, wherein cross sections of the guide rail grooves on the left guide rail and the right guide rail are of an inverted-T-shaped structure, and cross sections of the sliding parts on the left sliding block and the right sliding block are also of an inverted-T-shaped structure.

* * * * *